Sept. 5, 1939.  C. A. NORGREN  2,171,945

HOSE CONNECTOR

Filed March 2, 1937

INVENTOR.
CARL A. NORGREN
BY
ATTORNEY.

Patented Sept. 5, 1939

2,171,945

UNITED STATES PATENT OFFICE 2,171,945

HOSE CONNECTOR

Carl A. Norgren, Denver, Colo.

Application March 2, 1937, Serial No. 128,589

2 Claims. (Cl. 285—84)

This invention relates to improvements in hose connections, more particularly for high pressure use.

It is an object of the invention to provide means for permanently attaching a threaded element to the end of a pressure hose.

Another object of the invention is to provide such an attachment wherein the main point of attachment is remote from the hose-end.

A further object is the provision of means for attaching a threaded element onto the end of a pressure hose with a minimum expenditure of time and labor.

Other objects and advantages reside in details of design and construction that will be more fully disclosed in the following description and in the drawing wherein like parts have been similarly designated and in which Figure 1 is a side elevation of the improved hose connection;

Figure 1:
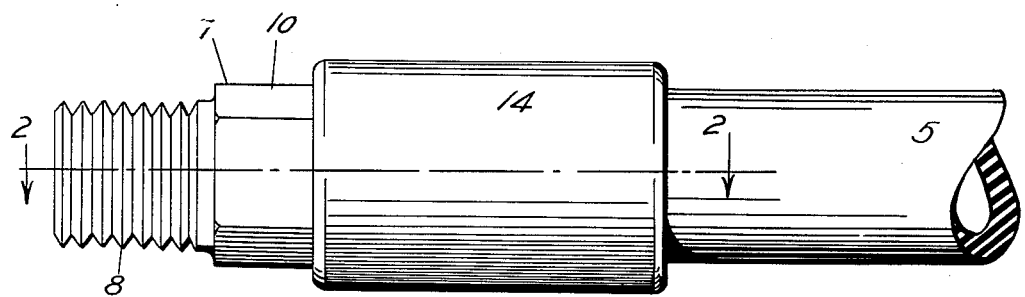

In the drawing, numeral 5 denotes an end portion of a rubber hose built for high pressure work and having reenforcing wire or other material 6 that is usually built into the body of a hose of this kind in layers or strata to add strength and pressure-resisting properties to the rubber.

A metallic nipple 7 has a threaded end 8 which may be either externally or internally threaded and a longitudinal bore 9, preferably of approximately the diameter of the inside passage of the hose, extends through the nipple. An external portion 10 of the nipple may be square or hexagon to receive a wrench and another externally threaded portion 12 is adjacent. The nipple extends for some length beyond the threaded portion in a smooth tube-like form terminating at the end opposite the threads, in an external enlargement 13 shaped to facilitate its being thrust into the hose and to resist its withdrawal therefrom, it being of greater diameter than the normal inside diameter of the hose.

A ferrule 14 is threaded internally at an end to fit the male threads 12 on the nipple and has internal helical corrugations 15 to fit snugly over the hose exterior. The other end of the ferrule is counter-bored at 16 to slightly clear the hose exterior for the distance that is in radial alinement with the enlarged end 13 of the nipple when the assembly is on a hose.

Operation

Figure 2:
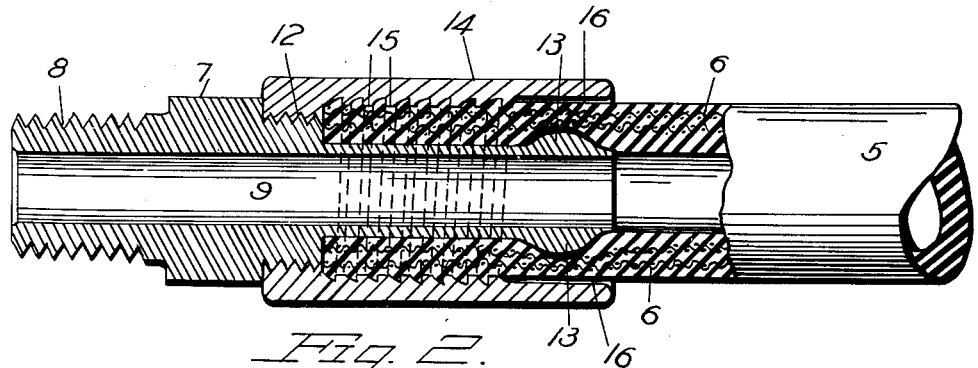
Figure 2 is a longitudinal section on line 2—2 of Figure 1.
Figure 3:
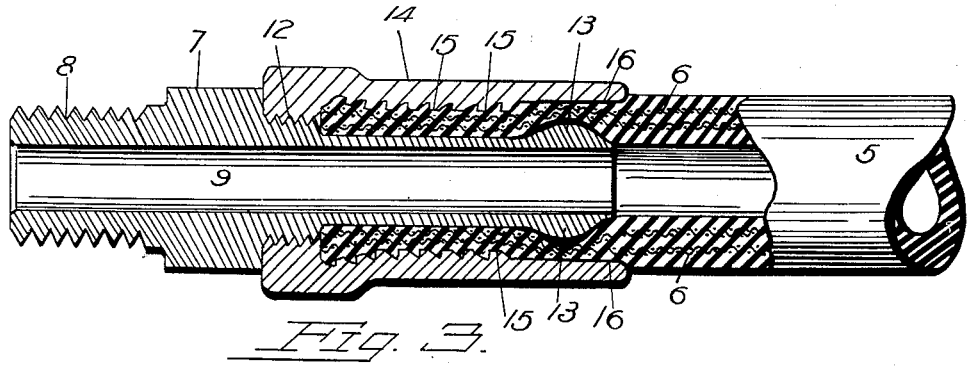
Figure 3 is a longitudinal section on the same line showing the position of the parts after the connection has been finally drawn into its permanent position.

In use, the ferrule 14 is slipped onto the end of a hose far enough for the shoulder of the threaded portion to engage the hose-end. The nipple 7 is then inserted into the hose so that its threads 12 engage the internal threads in the ferrule, whereupon the nipple is screwed into the ferrule so that the shoulder of the portion 10 abuts the end thereof as shown in Figures 1 and 2, and the enlarged end 13 is in radial alinement with the ferrule counter-bore 16. The ferrule, for a distance extending from the countersunk end to approximately three quarters of its length, is next reduced in diameter by a die or other tool. This compresses the hose between the nipple and the ferrule under great pressure as shown in Figure 3. The corrugations 15 in the ferrule are forced into the outer hose wall and the counter-bore 16 in the ferrule compresses the hose-wall between its internal surface and the enlarged end 13 of the nipple, thus forming a compression lock of the nipple and ferrule to the hose that is well back from the hose end.

The hose-walls are compressed between the smooth exterior part of the nipple and the internally corrugated part of the ferrule, but the greatest compression is at the enlarged end of the nipple. And since the nipple and ferrule are united by the threads 12, they would be acted upon as a unit, by any force tending to strip the connection from the hose.

It will be seen that the connection will resist removal from the hose since the entire portion of the hose-wall from the enlarged end 13 of the nipple to the end of the hose is highly compressed but presents a wall thickness that is greater than the radial distance between the enlarged nipple-end 13 and the counter-bore 16.

When the ferrule is contracted it will be elongated so that in addition to the radial clamping effect there is a longitudinal component exerting a further clamping pressure between the shoulder of the counter-bore and the enlarged end of the nipple.

This extreme compression at the end of the nipple will further serve the useful purpose of confining the material of the hose that is between the hose-end and the nipple-end so that a greater degree of compression is attained in this zone than would be had if this yieldable material were free to partially flow out from between the two compressing members.

Tests have proven that high-pressure hose will fail elsewhere before the improved connection can be blown, pulled or otherwise forced off the hose-end.

The threaded end 8 of the connection may be used in many ways such as for instance, to attach a pneumatic or hydraulic device, to connect the hose to a pressure pump, to connect another length of hose and the like. The connection is permanently attached to the hose-end and will normally outlast the hose. Its exterior is smooth and presents no projections to catch on anything or injure the hands of a user.

What I claim and desire to secure by Letters Patent is:

1. A hose coupling comprising an externally threaded nipple having a shoulder, and an enlarged end portion inserted into a hose, and engaging the hose-end on said shoulder, and an internally shouldered and threaded ferrule in threaded engagement with the nipple and also engaging the end of the hose on its shoulder and contracted around the hose to compress the same radially against and around said nipple, there being a counterbore at the ferrule end opposite the shoulder and in radial alinement with the enlarged end portion of the nipple, the annular space between the coupling elements being reduced at the enlarged nipple-end whereby the compression exerted on the hose is locally increased to resist longitudinal flow of the hose wall away from said shoulders and thereby to confine a portion of the hose and increase the degree of compression thereof.

2. A hose coupling comprising an externally threaded nipple having a shoulder and an enlarged end portion inserted into a hose, and engaging the hose-end on said shoulder, and an internally threaded ferrule in threaded engagement with the nipple and contracted around the hose to compress the same radially against and around said nipple, there being a counterbore at the ferrule end in radial alinement with the enlarged end portion of the nipple, the annular space between the coupling elements being reduced at the enlarged nipple-end whereby the compression exerted on the hose is locally increased to resist longitudinal flow of the hose wall away from said shoulder and thereby to confine a portion of the hose and increase the degree of compression thereof.

CARL A. NORGREN.